H. M. HOBART.
ELECTRIC SHIP PROPULSION.
APPLICATION FILED NOV. 20, 1914.
1,273,782.
Patented July 23, 1918.
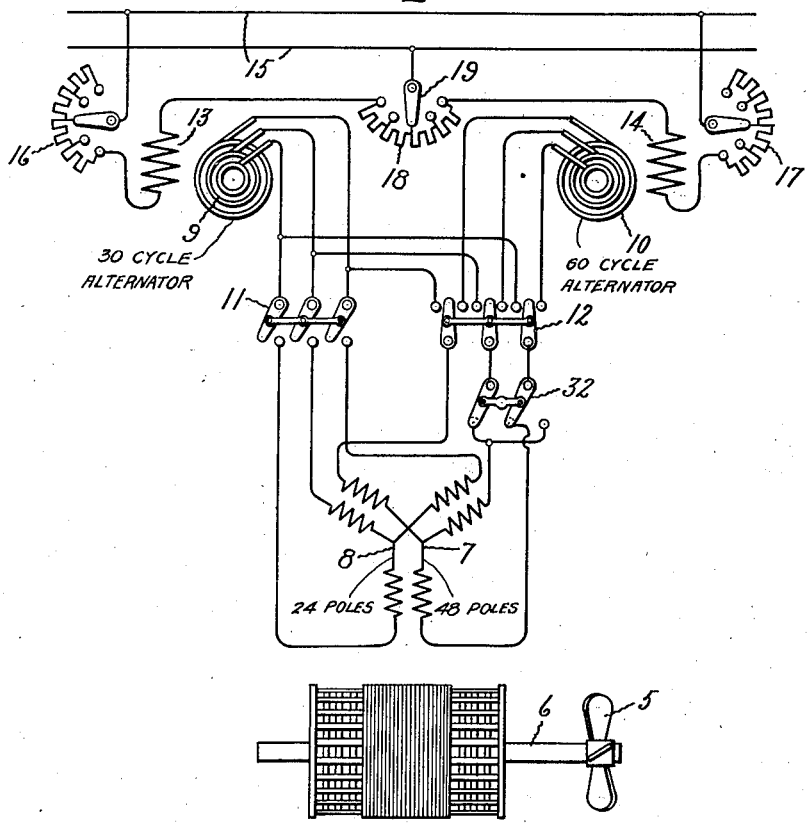
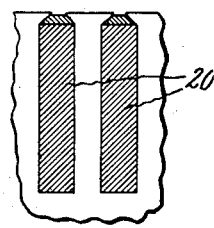
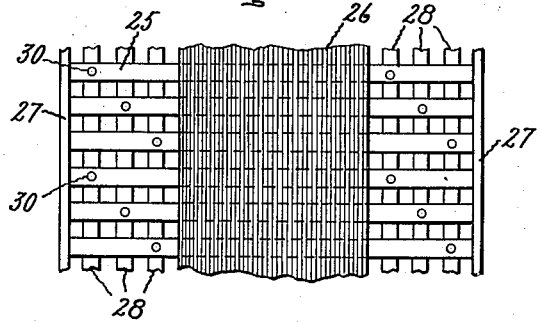
Witnesses:
Anthony Mart
J. Ellis Glen.
Inventor:
Henry M. Hobart,
by His Attorney.

UNITED STATES PATENT OFFICE.

HENRY M. HOBART, OF SCHENECTADY, NEW YORK, ASSIGNOR TO GENERAL ELECTRIC COMPANY, A CORPORATION OF NEW YORK.

ELECTRIC SHIP PROPULSION.

1,273,782.  Specification of Letters Patent.  Patented July 23, 1918.

Application filed November 20, 1914. Serial No. 873,112.

*To all whom it may concern:*

Be it known that I, HENRY M. HOBART, a citizen of the United States, residing at Schenectady, county of Schenectady, State of New York, have invented certain new and useful Improvements in Electric Ship Propulsion, of which the following is a specification.

My invention relates to systems of electric ship propulsion. The object of my invention is to provide a novel and improved system of electric ship propulsion. More particularly the object of my invention is to provide an improved system of electric ship propulsion comprising alternating current electric generators and squirrel cage induction motors for starting a ship's propeller and carrying it up to the running speed with ample torque throughout the entire range of speed.

It is well known that the use of a high resistance squirrel cage winding in an induction motor permits of obtaining fair starting and accelerating torque. Such a motor is, however, exceedingly inefficient at all speeds, and further has great slip during normal operation, and can only be rated at the low value imposed by the great amount of heat developed in the secondary winding. A motor of relatively large starting torque is necessary to start a ship's propeller and for the reversing and maneuvering operations of a ship. In a great many instances two speeds are sufficient for the driving of a ship's propeller, a low cruising or maneuvering speed and a high running speed. A motor for satisfactory operation in a system of electric ship propulsion should thus be a multi-speed motor, preferably having two speed stages, and should possess not only high starting torque but also high efficiency.

The purpose of my present invention is to provide in a system of electric ship propulsion a propeller driving motor or motors of the squirrel cage induction motor type having relatively high torque at starting and at the low or maneuvering speed and adapted to run at two speed stages with the highest efficiency and greatest available power at the higher speed stage. To this end, I provide a primary induction motor winding consisting of two independent component windings of different pole numbers. I further provide two sources of alternating current supply each of a different frequency, and of a frequency bearing to one another the same ratio as that of the pole numbers of the two component primary windings. The frequencies of the alternating currents of the two sources and the pole numbers of the two component primary windings are furthermore so related that primary magnetic fields having a substantially common synchronous speed may be produced by electrically connecting the two sources of alternating current supply to particular corresponding primary windings. When the sources of alternating current supply are simultaneously connected to the primary windings so that the two component resulting magnetic fields have substantially the same synchronous speed the system operates at maximum efficiency and with the maximum available power. By independently connecting the two sources of alternating current supply to the other component primary windings it will be evident that two other speeds may be obtained, one higher and one lower than the common synchronous speed. For ship propulsion the higher speed connection is seldom desired and is further substantially valueless, and so I only provide connections for obtaining the lower speed, which is the maneuvering or cruising speed herein referred to. In order to secure higher starting torque, I provide a short-circuited secondary winding of inductively changing effective resistance, that is, a winding whose effective resistance is inductively changed as the motor speeds up due to the decreasing frequency of the secondary current. This characteristic of the secondary winding I obtain by employing deep conducting bars positioned in deep slots in the magnetic material of the secondary member. I further provide in combination with the motor of the above described type a short-circuited secondary winding having relatively high resistance for a primary magnetic field of a particular polar number and having relatively low resistance for a primary magnetic field of another polar number.

The novel features which I believe to be patentably characteristic of my invention are definitely indicated in the claims appended hereto. The arrangement of apparatus in a system of electric ship propulsion embodying my invention and the operation of such a system will be understood from the following description taken in connection with the accompanying drawings, in which:

Figure 1 is a diagrammatic view of a system of electric ship propulsion embodying my present invention, and Figs. 2 and 3 are detail views illustrating certain features of construction of the short-circuited secondary winding of the induction motor which I use in this system.

A ship's propeller 5 is rigidly secured to a shaft 6 upon which is mounted the secondary member of a propeller driving induction motor. While I have illustrated in the accompanying drawings a single propeller directly connected to a single motor it will be evident to those skilled in the art that a plurality of propellers and a plurality of motors operatively interconnected in any suitable way may be provided as necessary or desired. The primary winding of the propeller driving motor consists of two independent component primary windings. One of these component primary windings 7 is connected as a 48-pole winding, while the other component primary winding 8 is connected as a 24-pole winding. Each of the component primary windings is adapted to be independently supplied with polyphase alternating current. It will be understood that the two component primary windings are contained in a common magnetic member and that the secondary winding of the motor is inductively related to both component primary windings.

Two electric alternators 9 and 10 for supplying polyphase alternating currents to the primary windings 7 and 8 are provided. The alternator 9 generates alternating current having a frequency of 30 cycles, while the alternator 10 has a frequency of 60 cycles. A switch 11 serves to electrically connect the alternator 9 to the primary winding 8. A switch 12 serves to connect either the alternator 9 or the alternator 10 to the primary winding 7. The field windings 13 and 14 of the alternators 9 and 10 respectively are connected across direct current bus bars 15. A rheostat 16 is provided for controlling the magnitude of the current flowing in the field winding 13, and a similar rheostat 17 is provided for controlling the current flowing in the field winding 14. A rheostat 18 is included in the circuit of each of the alternator field windings and is so arranged that a movement of its controller 19 relatively varies the excitation of the two alternators. Thus by moving the controller 19 toward the right, the excitation of the 60-cycle alternator is increased while the excitation of the 30-cycle alternator is diminished. The secondary winding of the propeller driving motor is of the squirrel cage type. In order to increase the starting torque of the motor, I construct the secondary winding so that it has an inductively changing effective resistance. To this end, the conductor bars 20 of the winding are positioned in relatively deep slots in the magnetic material of the secondary member. Due to the depth of the slots in which the conductor bars are positioned, the conductor bars will have considerable inductance when the secondary current is of relatively high frequency, that is when the motor is starting. As the motor speeds up the frequency of the secondary current decreases and hence the inductance of the conductor bars diminishes. With the deep-slot conductor bar construction it will therefore be seen that the effective resistance of the secondary winding inductively changes due to the change in the frequency of the secondary current as the speed of the motor changes. At starting and at relatively low speeds the secondary winding will accordingly, have relatively high effective resistance, while at speeds in the vicinity of synchronism the secondary winding will have a relatively low effective resistance. This insures an augmented starting torque of the motor which is essential in a successful and practical system of electric ship propulsion.

The propeller driving motor in my novel and improved system is provided with a secondary winding having relatively low resistance with respect to a primary magnetic field of one pole number and relatively high resistance with respect to a primary magnetic field of another pole number. The construction of the secondary winding to accomplish this end will be understood by reference to Fig. 2 of the drawings. In this figure conductor bars 25 are suitably positioned in slots in a magnetic core 26. The conductor bars are connected at each end to high resistance end rings 27. Between each high resistance end ring 27 and the adjacent end of the magnetic core 26 are provided three low resistance end rings 28. The conductor bars 25 are connected to the low resistance end rings 28 at equidistant points 30 corresponding to one pole pitch for a primary magnetic field of 24 poles. It will thus be seen that for a primary magnetic field of 24 poles, the conductor bars 25 are connected to the low resistance end rings 28 as a full or 100 per cent. pitch winding. Such a winding acts in effect as an ordinary squirrel cage winding, and will, accordingly, have relatively low resistance. When a primary magnetic field of 48 poles is produced the conductor bars 25 will be connected to the end rings 28 as a 200 per cent. pitch winding, or in other words will in effect be open-circuited for a primary magnetic field of this pole number. The secondary current will hence be forced to flow through the high resistance end rings 27 when a primary magnetic field of 48 poles is produced.

The operation of my novel and improved system of electric ship propulsion is briefly as follows: At starting I supply the 48-pole primary winding with polyphase alternating current of 30 cycles from the alternator 9. At this stage of the operation the 24-pole primary winding is left out of circuit. The rotor of the motor begins to turn and runs up toward a synchronous speed of 75 R. P. M. Due to the high inductance of the conductor bars of the secondary winding caused by the deep-slot construction and furthermore due to the fact that for a primary magnetic field of 48 poles the secondary current is forced to flow through the high resistance end rings 27, the motor will have high starting torque because of the relatively high resistance of the secondary winding. Let us assume that the ship's resistance and the slip of the rotor are such that equilibrium occurs at a speed of 70 R. P. M. At this speed I may throw the 48-pole primary winding over to alternator 10 generating current of 60 cycles and connect the 24-pole primary winding to the alternator 9 generating current of 30 cycles. Under the influence of the 48-pole primary winding the squirrel cage at once experiences a large increase in torque to which is added the further torque due to the influence of the 24-pole primary winding. It will be evident that when the 60-cycle alternator is connected to the 48 pole primary winding and the 30-cycle alternator is connected to the 24 pole primary winding that each of these primary windings are producing rotary magnetic fields having a synchronous speed of 150 R. P. M. This is the high speed of the system and is the speed at which a merchant ship's propellers would be ordinarily operated.

At the high speed, that is at 150 R. P. M. there will be a tendency for the 24-pole primary winding to carry the bulk of the load. It is, therefore, desirable to divert some of the load to the 48-pole primary winding by increasing the excitation of the 60-cycle alternator, thus decreasing the slip corresponding to the 48-pole primary winding. The same result may be obtained by decreasing the excitation of the 30-cycle generator which increases the slip corresponding to the 24-pole winding. In any event, it is a case of balancing between capacity and efficiency. If the 48 and 24-pole systems, that is stator windings and generators, are of the same size, then the maximum output for a short time will correspond to the diversion of a considerable amount of the load to the 60 cycle circuit. But the best efficiency will be obtained by carrying the greater part of the load at the high speed by the 30 cycle circuit. In the drawings I have diagrammatically represented rheostats 16 and 17 for varying the excitation of the field windings 13 and 14 of the alternators 9 and 10 respectively. I have furthermore shown a rheostat 18 which serves by the movement of a single controller to increase the excitation of one alternator and decrease the excitation of the other alternator. It will be understood by those skilled in the art that the same result may be accomplished by designing the 48-pole primary winding with less volts per turn than the 24-pole primary winding.

The power required to propel a ship varies substantially as the cube of the speed. With a ratio of speed stages of one to two it will be evident that the necessary power to produce the two speeds will be of the ratio of one to eight, or in other words substantially eight times as much power is required for the high speed operation of the ship as for its low speed operation. For the low speed operation of the ship only the 30-cycle alternator need be run, while for the high speed operation both alternators will be needed to supply the necessary power. A ship is usually operated in the reverse direction only at its low speed stage and I have, accordingly, shown a reversing switch 32 in connection with the 48-pole primary winding.

I have herein designated for the purposes of illustration certain specific pole numbers and frequencies, but it will of course be understood that other combinations of pole numbers and frequencies may be employed without departing from the spirit of my invention. The most advantageous ratio of pole numbers of the primary winding is one to two, since under this condition the type of squirrel cage winding which I employ in my system of electric ship propulsion is most effective. My invention may, however, be carried out with a different ratio of pole numbers of the primary windings as will be readily understood in the art. I have illustrated two independent alternators as the preferred means for supplying alternating currents of two different frequencies, but it will be obvious that any suitable source of alternating currents of the necessary frequencies may be used.

I have explained my invention by illustrating and describing a certain specific embodiment thereof, but it will be readily understood by those skilled in the art that the invention may be embodied in many other forms than that shown and described. I, accordingly, do not wish to be restricted to the particular form or construction disclosed herein by way of example for the purpose of setting forth my invention in accordance with the patent statutes. The terms of the appended claims are, therefore, not restricted to the precise structure disclosed, but are intended to cover all changes and modifications within the spirit and scope of my invention.

What I claim as new and desire to secure by Letters Patent of the United States, is:—

1. In a system of electric ship propulsion, a propeller, means for producing alternating currents of two different frequencies, a propeller-driving induction motor having two primary windings one of which has a greater number of poles than the other, the frequency of said alternating currents and the pole numbers of said primary windings being so related that primary magnetic fields having a substantially common synchronous speed may be produced by supplying alternating current of a particular frequency to a particular corresponding primary winding, a secondary winding having relatively high resistance with a primary magnetic field produced by the primary winding having the greater number of poles and relatively low resistance with a primary magnetic field produced by the primary winding having the smaller number of poles, and means for supplying alternating current to the primary winding having the greater number of poles for navigation of the ship under conditions requiring a relatively high motor torque and for supplying alternating currents to both of said primary windings to produce primary magnetic fields of said common synchronous speed for navigation of the ship at full speed.

2. In a system of electric ship propulsion, a propeller, two electric alternators adapted to generate alternating currents of different frequencies, a propeller-driving induction motor having two primary windings one of which has a greater number of poles than the other, the frequencies of the currents generated by said alternators and the pole numbers of said primary windings being so related that primary magnetic fields having a substantially common synchronous speed may be produced by electrically connecting the alternators to particular corresponding primary windings, a secondary winding having relatively high resistance with a primary magnetic field produced by the primary winding having the greater number of poles and relatively low resistance with a primary magnetic field produced by the primary winding having the smaller number of poles, means for electrically connecting one of said alternators to the primary winding having the greater number of poles for navigation of the ship under conditions requiring a relatively high motor torque and for electrically connecting said primary windings to their respective particular corresponding alternators for simultaneously producing primary magnetic fields of said common synchronous speed for navigation of the ship at full speed, and means for relatively varying the excitations of said two alternators for balancing the division of load between the alternators when both primary windings are simultaneously producing primary magnetic fields of said common synchronous speed.

3. In a system of electric ship propulsion, a propeller, two electric alternators adapted to generate alternating currents of different frequencies, an induction motor operatively connected to said propeller and having two primary windings one of which has a greater number of poles than the other, the frequencies of the currents generated by said alternators and the pole numbers of said primary windings being so related that primary magnetic fields having a substantially common synchronous speed may be produced by electrically connecting the alternators to particular corresponding primary windings, means for electrically connecting said primary windings to their respective particular corresponding alternators for simultaneously producing primary magnetic fields of said common synchronous speed, a resistance having a portion thereof included in the field circuit of one of said alternators and the remaining portion thereof included in the field circuit of the other of said alternators, and means cooperating with said resistance for varying the relative proportions of said resistance which are included in the field circuits of said two alternators for relatively varying the excitations of said alternators to balance the division of load between the alternators when both primary windings are simultaneously producing primary magnetic fields of said common synchronous speed.

In witness whereof I have hereunto set my hand this 18th day of November, 1914.

HENRY M. HOBART.

Witnesses:
BENJAMIN B. HULL,
HELEN ORFORD.